US009956625B2

(12) United States Patent
Adams et al.

(10) Patent No.: US 9,956,625 B2
(45) Date of Patent: *May 1, 2018

(54) RECIPROCATING SAW

(71) Applicant: Milwaukee Electric Tool Corporation, Brookfield, WI (US)

(72) Inventors: Joshua Adams, Milwaukee, WI (US); Ryan J. Denissen, Sussex, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/064,786

(22) Filed: Mar. 9, 2016

(65) Prior Publication Data

US 2016/0184907 A1 Jun. 30, 2016

Related U.S. Application Data

(63) Continuation of application No. 14/296,892, filed on Jun. 5, 2014, now Pat. No. 9,776,263, which is a
(Continued)

(51) Int. Cl.
*B23D 51/16* (2006.01)
*B23D 49/10* (2006.01)
(Continued)

(52) U.S. Cl.
CPC ............. *B23D 51/16* (2013.01); *B23D 49/10* (2013.01); *B23D 49/162* (2013.01); *F16J 7/00* (2013.01)

(58) Field of Classification Search
CPC ........ B23D 49/08; B23D 49/10; B23D 49/14; B23D 49/62; B23D 51/16; F16J 7/10
See application file for complete search history.

(56) References Cited

U.S. PATENT DOCUMENTS

| 1,793,053 A | 2/1931 | Cahill et al. |
| 2,764,188 A | 9/1956 | Hoffman |

(Continued)

FOREIGN PATENT DOCUMENTS

| DE | 3828785 | 4/1989 |
| FR | 1116778 | 5/1956 |

(Continued)

OTHER PUBLICATIONS

Porter-Cable Unveils New Reciprocating and Orbital Reciprocating Saws (Feb. 17, 2011). [online] Porter-Cable [retrieved Feb. 5, 2018].*

(Continued)

*Primary Examiner* — Jennifer Swinney
(74) *Attorney, Agent, or Firm* — Michael Best & Friedrich LLP

(57) ABSTRACT

A reciprocating saw includes a housing, a motor, and a drive mechanism. The drive mechanism includes a driven gear that is rotated by the motor. The driven gear is vertically-oriented within the housing and has an upper portion and a lower portion. The drive mechanism also includes a connecting rod coupled to the driven gear to translate rotary motion of the driven gear into reciprocating motion, and an output shaft coupled to the connecting rod to reciprocate relative to the housing through a cutting stroke and a return stroke. The drive mechanism further includes a counterweight coupled to the driven gear for rotation with the driven gear. The counterweight moves through the upper portion of the driven gear during the cutting stroke of the output shaft, and moves through the lower portion of the driven gear during a return stroke of the output shaft.

19 Claims, 6 Drawing Sheets

Related U.S. Application Data continuation-in-part of application No. 12/842,209, filed on Jul. 23, 2010, now Pat. No. 9,579,735.

(60) Provisional application No. 61/831,968, filed on Jun. 6, 2013.

(51) Int. Cl.
*B23D 49/16* (2006.01)
*F16J 7/00* (2006.01)

(56) References Cited

U.S. PATENT DOCUMENTS

| | | | | |
|---|---|---|---|---|
| 3,270,369 | A * | 9/1966 | Mandell | A22B 5/205 |
| | | | | 30/394 |
| 3,482,458 | A | 12/1969 | Bednarski | |
| 5,007,172 | A * | 4/1991 | Palm | B23D 49/167 |
| | | | | 30/377 |
| 5,212,887 | A * | 5/1993 | Farmerie | B23D 49/165 |
| | | | | 30/392 |
| 6,212,781 | B1 | 4/2001 | Marinkovich et al. | |
| 7,658,012 | B2 * | 2/2010 | James | B23D 51/16 |
| | | | | 30/392 |
| 7,793,420 | B2 | 9/2010 | Griep et al. | |
| 8,407,902 | B2 | 4/2013 | Naughton et al. | |
| 8,640,347 | B2 | 2/2014 | Baxivanelis et al. | |
| 2002/0170186 | A1 * | 11/2002 | Sakaguchi | B23D 51/16 |
| | | | | 30/394 |
| 2004/0231170 | A1 * | 11/2004 | Neitzell | B23D 51/01 |
| | | | | 30/340 |
| 2006/0117580 | A1 | 6/2006 | Serdynski et al. | |
| 2011/0107608 | A1 | 5/2011 | Wattenbach et al. | |

FOREIGN PATENT DOCUMENTS

| | | | | | |
|---|---|---|---|---|---|
| FR | 1264595 | A | * | 6/1961 | B23D 49/162 |
| GB | 772079 | A | * | 4/1957 | B23D 51/025 |

OTHER PUBLICATIONS

Deboer "Porter Cable Announces 2 New Reciprocating Saws," Pro Tool Reviews, <https://www.protoolreviews.com/news/porter-cable-reciprocating-saws/2952/> Published Feb. 18, 2011 (5 pages).
Porter Cable "PC85TRSO Orbital Reciprocating Saw Instruction Manual," and photographs, published Dec. 2013 (3 pages).

* cited by examiner

RECIPROCATING SAW

CROSS-REFERENCE TO RELATED APPLICATIONS

This application is a continuation of U.S. patent application Ser. No. 14/296,892, filed Jun. 5, 2014, now U.S. Pat. No. 9,776,263 issued Oct. 3, 2017, which claims priority to U.S. Provisional Patent Application No. 61/831,968, filed Jun. 6, 2013, and which is a continuation-in-part of U.S. patent application Ser. No. 12/842,209, filed Jul. 23, 2010, the entire contents of all of which are incorporated by reference herein.

BACKGROUND

The present invention relates to power tools and, more particularly, to reciprocating saws.

Power tools include different types of drive mechanisms to perform work. Power tools with reciprocating-type drive mechanisms commonly include counterweights to counterbalance forces generated by output elements (e.g., saw blades) during reciprocating movement. Due to the orientation of the counterweights within the power tools, however, movement of the counterweights may generate inertia that tends to move the power tools away from work pieces while the power tools are operating.

SUMMARY

In one embodiment, the invention provides a power tool including a housing and a motor positioned within the housing. The motor includes a pinion. The power tool also includes a drive mechanism positioned within the housing and coupled to the motor. The drive mechanism includes a driven gear that engages the pinion and is rotated by the motor. The driven gear is vertically-oriented within the housing and has an upper portion and a lower portion. The drive mechanism also includes a connecting rod coupled to the driven gear to translate rotary motion of the driven gear into reciprocating motion, and an output shaft coupled to the connecting rod to reciprocate relative to the housing through a cutting stroke and a return stroke. The output shaft is configured to support a tool element. The drive mechanism further includes a counterweight coupled to the driven gear for rotation with the driven gear. The counterweight moves through the upper portion of the driven gear during the cutting stroke of the output shaft, and moves through the lower portion of the driven gear during a return stroke of the output shaft.

In another embodiment, the invention provides a power tool including a housing having a rearward portion and a forward portion. The rearward portion has a handle. The power tool also includes a motor positioned within the housing. The motor includes a pinion that rotates about a motor axis. The power tool further includes a trigger supported by the handle and operable to control the motor. The trigger is positioned above the motor axis. The power tool also includes a drive mechanism positioned within the housing and coupled to the motor. The drive mechanism includes an output shaft driven by the motor to reciprocate relative to the housing. The output shaft is configured to support a tool element adjacent the forward portion of the housing. The drive mechanism also includes a counterweight driven by the motor to rotate relative to the housing through a path. As the counterweight moves through a rearward half of the path, the counterweight generally moves in an upward direction. As the counterweight moves through a forward half of the path, the counterweight generally moves in a downward direction.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
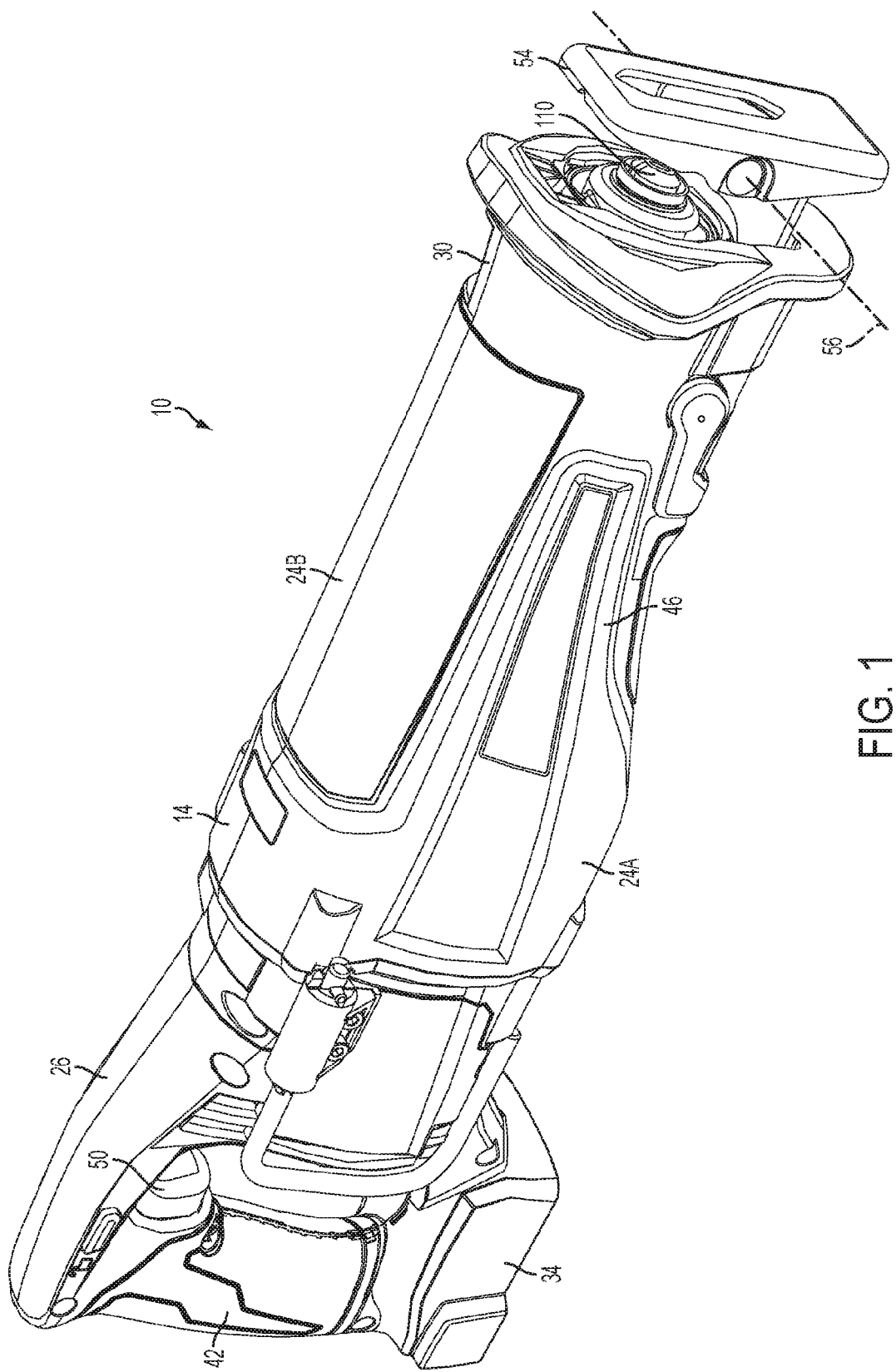
FIG. 1 is a perspective view of a reciprocating saw embodying the invention.
Figure 2:
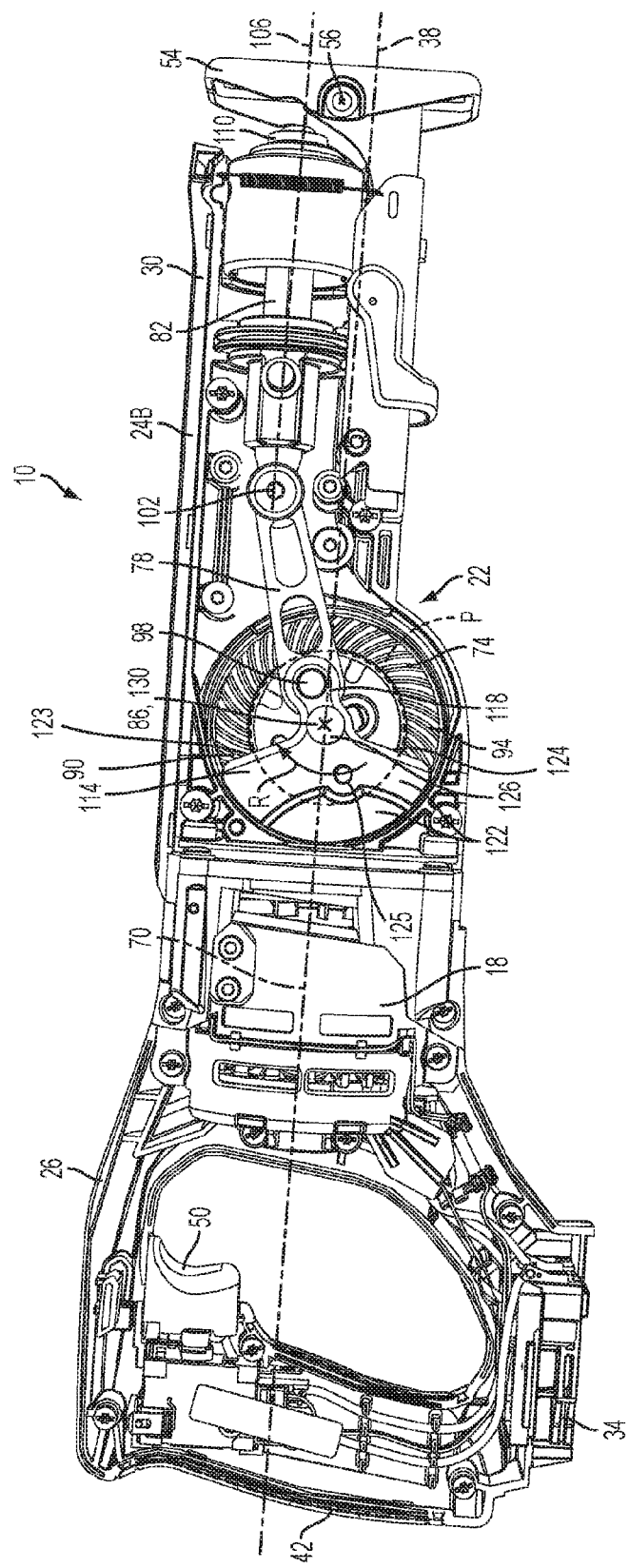
FIG. 2 is a side view of the reciprocating saw with a portion of a housing removed.
Figure 3:
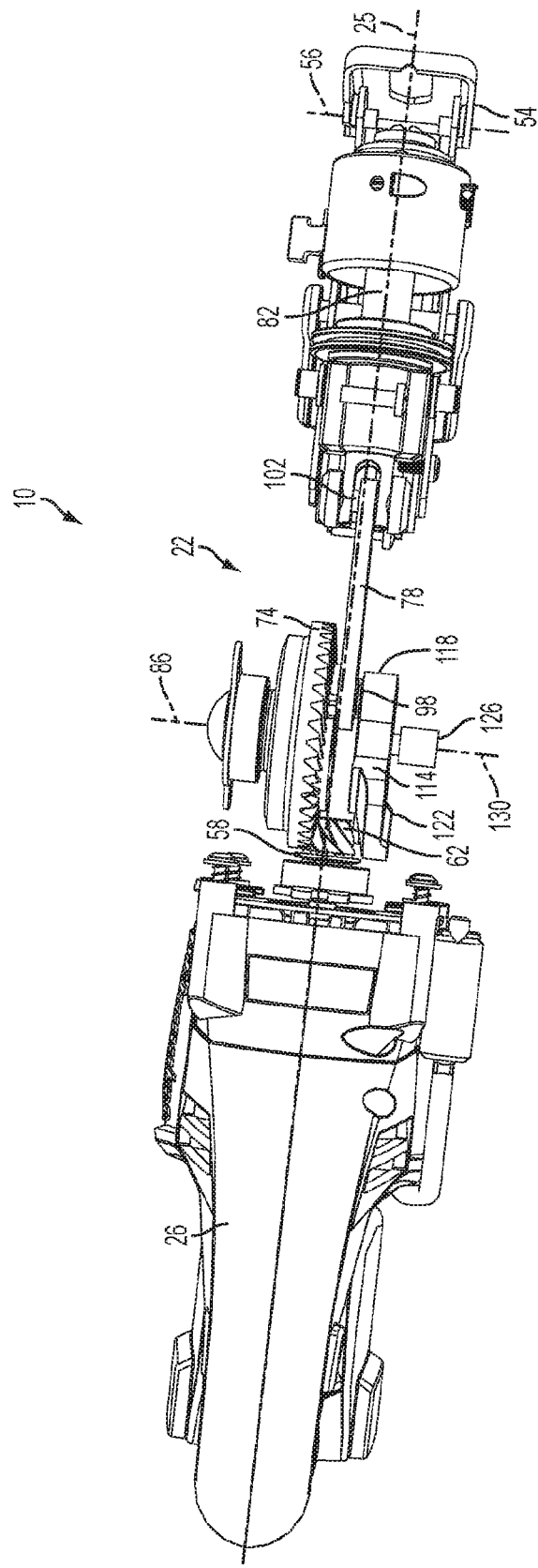
FIG. 3 is a top view of the reciprocating saw with a portion of the housing removed.

FIGS. 1-3 illustrate a power tool 10. In the illustrated embodiment, the power tool 10 is a reciprocating saw. In other embodiments, the power tool 10 may be another type of device that utilizes a reciprocating-type drive mechanism, such as a jigsaw, a sabre saw, a hammer drill, or the like.

The illustrated reciprocating saw 10 includes a housing 14, a motor 18 positioned within the housing 14, and a drive mechanism 22 coupled to the motor 18 and positioned within the housing 14. As shown in FIG. 1, the housing 14 is comprised of two clamshell halves 24A, 24B that are connected together along a plane 25 (FIG. 3). In the illustrated embodiment, the clamshell halves 24A, 24B are secured together with threaded fasteners (e.g., screws), but may alternatively be secured together using other suitable coupling means. FIG. 2 illustrates the reciprocating saw 10 with one of the clamshell halves 24A removed to facilitate illustration of the internal components (e.g., the motor 18, the drive mechanism 22, etc.) of the saw 10.

Referring back to FIG. 1, the housing 14 includes a rearward portion 26, a forward portion 30, and a battery support portion 34. The housing 14 also defines a longitudinal axis 38 (FIG. 2) that extends through the rearward and forward portions 26, 30. The rearward portion 26 includes a D-shaped handle 42, and the forward portion 30 includes a grip 46. The D-shaped handle 42 and the grip 46 are configured to be grasped by a user during operation of the reciprocating saw 10. An actuator or trigger 50 is supported by the rearward portion 26 adjacent the D-shaped handle 42. The trigger 50 is actuatable by a user to selectively power the motor 18. In the illustrated embodiment, the trigger 50 is positioned above the longitudinal axis 38, and the longitudinal axis 14 generally divides the housing 14 into an upper section and a lower section. A shoe 54 extends from and is pivotally coupled the forward portion 30 of the housing 14. The shoe 54 pivots about a pivot axis 56 and facilitates aligning the reciprocating saw 10 on a work piece to be cut.

The battery support portion 34 is formed on the rearward portion 26 of the housing 14 below the D-shaped handle 42. In the illustrated embodiment, the battery support portion 34 is located beneath the longitudinal axis 38 of the housing 14 when the reciprocating saw 10 is viewed as shown in FIG. 2. In other embodiments, the battery support portion 34 may be located elsewhere on the housing 14. The battery support portion 34 is configured to receive a battery pack (e.g., an 18 volt Li-ion power tool battery pack) and electrically connect the battery pack to the motor 18. In other embodiments, the battery pack may have different voltages and/or chemistries. In still other embodiments, the reciprocating saw 10 may include a power cord such that the motor 18 is powered by an AC power source (e.g., a wall outlet, a portable generator, etc.).

As shown in FIG. 2, the motor 18 is positioned within the housing 14 between the rearward portion 26 and the forward portion 30. The motor 18 is also electrically connected to the battery pack (or other suitable power source) through the trigger 50. As shown in FIG. 3, the motor 18 includes a motor shaft 58 and an output gear or pinion 62. Referring back to FIG. 2, the motor shaft 58 defines a central longitudinal axis 70, or motor axis, of the motor 18. In the illustrated embodiment, the central longitudinal axis 70 of the motor 18 is generally aligned or coaxial with the longitudinal axis 38 of the housing 14. When powered, the motor 18 rotates the motor shaft 58 and the pinion 62 about the axis 70 to drive the drive mechanism 22.

As shown in FIGS. 2 and 3, the drive mechanism 22 is positioned at least partially within the forward portion 30 of the housing 14 between the motor 18 and the shoe 54. The illustrated drive mechanism 22 is a slider-crank mechanism that includes a driven gear 74, a connecting rod 78, and an output shaft 82. However, other mechanisms known in the art, such as a scotch-yoke mechanism, are also contemplated. The driven gear 74 engages the pinion 62 of the motor 18 and defines a central axis 86 about which the gear 74 rotates. In the illustrated embodiment, the central axis 86 is perpendicular to the longitudinal axis 38 of the housing 14, extends between opposing sides of the housing 14, and is parallel to the pivot axis 56 of the shoe 54. More particularly, the central axis 86 is perpendicular to the plane 25 along which the clamshell halves 24A, 24B of the housing 14 are connected. The driven gear 74 is thereby vertically-oriented within the housing 14.

The longitudinal axis 38 of the housing 14 and the central axis 70 of the motor 18 extend through a center of the gear 74 (i.e., through the central axis 86) to divide the gear 74 into a first, or upper, portion 90 and a second, or lower, portion 94. In the illustrated embodiment, the upper portion 90 of the driven gear 74 is located on the same side of the longitudinal axis 38 as the output shaft 82 and the trigger 50, while the lower portion 94 of the driven gear 74 is located on the same side of the longitudinal axis 38 as the battery support portion 34. In other embodiments, the output shaft 82 may be located on the opposite side of the longitudinal axis 38 such that the lower portion 94 of the driven gear 74 is located on the same side of the longitudinal axis 38 as the output shaft 38. It should be understand that what constitutes the upper and lower portions 90, 94 of the driven gear 74 changes during operation of the drive mechanism 22 because the gear 74 rotates. The terms "upper" and "lower" are simply illustrative terms used to help describe volumes of spaces above and below the axes 38, 70 that are occupied by sections of the gear 74 at any given time. At a particular instance in time, the actual section of the gear 74 that qualifies as the "upper portion" or the "lower portion" is different than at another instance in time.

The connecting rod 78, or drive arm, includes a first end that is coupled to the driven gear 74 by a crank pin 98 and a second end that is coupled to the output shaft 82 by a pivot pin 102. The crank pin 98 is offset from the central axis 86 of the driven gear 74 such that, as the gear 74 is rotated, the crank pin 98 moves about the central axis 86. As the first end of the connecting rod 78 moves with the driven gear 74, the second end of the connecting rod 78 pushes and pulls the output shaft 82 in a reciprocating motion. The crank pin 98 allows the connecting rod 78 to pivot vertically relative to the driven gear 74, while the pivot pin 102 allows the connecting rod 78 to pivot vertically relative to the output shaft 82.

The output shaft 82, or spindle, reciprocates within the forward portion 30 of the housing 14 generally along a spindle axis 106. In the illustrated embodiment, the spindle axis 106 is generally parallel to and positioned above the longitudinal axis 38 of the housing 14. Rotary motion of the motor 18 is thereby translated into linear reciprocating motion of the output shaft 82 by the driven gear 74 and the connecting rod 78.

The motor axis 70 and the spindle axis 106 together define a plane. The driven gear 74 is vertically-oriented within the housing 14 in that the gear 74 rotates about an axis (i.e., the central axis 86) that is perpendicular to the plane defined by the motor and spindle axes 70, 106. In the illustrated embodiment, the plane defined by the motor and spindle axis 70, 106 is the same as the plane 25 (FIG. 3) along which the clamshell halves 24A, 24B are coupled together. In other embodiments, one or both of the motor and spindle axes 70, 106 may be offset from, yet still parallel to the plane 25.

Figure 4:
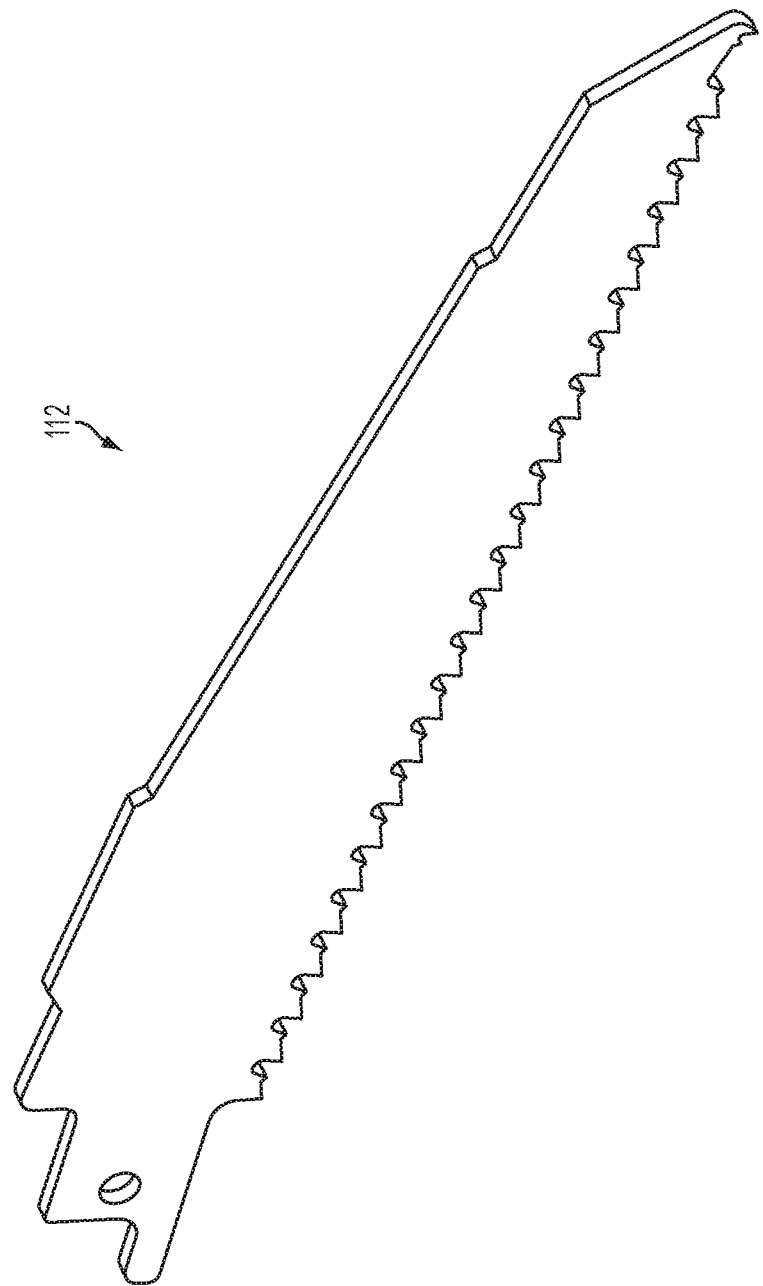
FIG. 4 illustrates a saw blade for use with the reciprocating saw.

With continued reference to FIG. 2, a blade clamp 110 is coupled to an end of the output shaft 82 opposite from the connecting rod 78. The blade clamp 110 receives and secures a saw blade 112 (FIG. 4), or other tool element, to the output shaft 82 for reciprocating movement with the output shaft 82. The output shaft 82 supports the saw blade 112 such that, during operation of the reciprocating saw 10, the drive mechanism 22 moves the saw blade 112 through a cutting stroke when the output shaft 82 is pulled by the connecting rod 78 from an extended position to a retracted position, and through a return stoke when the output shaft 82 is pushed by the connecting rod 78 from the retracted position to the extended position.

The illustrated drive mechanism 22 also includes a counterweight 114. The counterweight 114 helps balance forces generated by the output shaft 82 and an attached saw blade during reciprocating movement. In the illustrated embodiment, the counterweight 114 and the driven gear 74 are separate elements, but may alternatively be integrally formed as a single piece. The illustrated counterweight 114 includes a connection portion 118 and a mass portion 122. The mass portion 122 has a leading edge 123, a trailing edge 124, and an aperture 125. The connection portion 118 is coupled to the connecting rod 78 via the crank pin 98. A guide pin 126 also extends from the connection portion 118 and engages an inner surface of the housing 14. The guide pin 126 supports the counterweight 114 within the housing 14 and defines an axis of rotation 130 of the counterweight 114. In the illustrated embodiment, the axis of rotation 130 of the counterweight 114 and the central axis 86 of the driven gear 74 are generally coaxial so that the counterweight 114 and the driven gear 74 rotate about the same axis.

Similar to the driven gear 74, the counterweight 114 is, therefore, also vertically-oriented within the housing 14. In the illustrated embodiment, the axis of rotation 130 intersects and is perpendicular to the motor axis 70.

The mass portion 122 extends from the connection portion 118 and includes a majority of the mass of the counterweight 114. As such, movement of the mass portion 122 in a direction opposite the movement of the output shaft 82 tends to balance the forces generated during reciprocation of the saw blade in a front-to-back direction. In the illustrated embodiment, the mass portion 122 has a generally semi-circular shape to match the circular shape and contour of the driven gear 74. That is, the counterweight 114 is shaped and sized so it does not extend outside of (or only extends outside a minimal amount of) a vertical footprint area defined by the driven gear 74. Such an arrangement reduces the amount of space required within the housing 14 to accommodate the counterweight 114. In other embodiments, the mass portion 122 may have other suitable shapes or configurations.

As the driven gear 74 rotates and drives the crank pin 98, the mass portion 122 of the counterweight 114 is moved in a substantially opposite direction than the output shaft 82 to counterbalance the inertial forces of the output shaft 82 and attached saw blade. In particular, the mass portion 122 of the counterweight 114 is in a first position (e.g., relatively close to the motor 18 and relatively far from the output shaft 82), as shown in FIG. 2, when the output shaft 82 is in the extended position. The mass portion 122 of the counterweight 114 rotates to a second position (e.g., relatively close to the output shaft 82 and relatively far from the motor 18) when the output shaft 82 is in the retracted position.

In the illustrated embodiment, the counterweight 114 rotates along a path P in a clockwise direction R (when viewing the reciprocating saw 10 as shown in FIG. 2) about the axis of rotation 130 between the first and second positions. That is, the mass portion 122 of the counterweight 114 travels generally above the longitudinal axis 38 of the housing 14 and through the upper portion 90 of the driven gear 74 during the cutting stroke of the output shaft 82 to move from the first position to the second position. Conversely, the mass portion 122 of the counterweight 114 travels generally below the longitudinal axis 38 of the housing 14 and through the lower portion 94 of the driven gear 74 during the return stroke of the output shaft 82 to move from the second position to the first position. Stated another way, as the mass portion 122 of the counterweight 114 moves through a rearward half of the path P (i.e., the half of the path P that is closer to the rearward portion 26 of the housing 14) at the end of the return stroke and start of the cutting stroke, the mass portion 122 generally moves in an upward direction (as viewed in FIG. 2) and toward the spindle axis 106. As the mass portion 122 of the counterweight 114 moves through a forward half of the path P (i.e., the half of the path P that is closer to the forward portion 30 of the housing 14) at the end of the cutting stroke and start of the return stroke, the mass portion 122 generally moves in a downward direction (as viewed in FIG. 2) and away from the spindle axis 106. This movement of the counterweight 114 causes the front of the saw 10 to tend to move into a work piece (downward in FIG. 2) as the cutting stroke begins.

Because the counterweight 114 is coupled to the driven gear 74 by the crank pin 98, the counterweight 114 does not actually move relative to the gear 74. Instead, the counterweight 114 and the driven gear 74 rotate together through the path P. As discussed above, the terms "upper portion" and "lower portion" of the driven gear 74 refer to volumes of space occupied by sections of the gear 74 during operation of the drive mechanism 22.

The arrangement of the counterweight 114 and the driven gear 74 increases cutting performance of the reciprocating saw 10 compared with rotation of the counterweight 114 in the opposite direction (e.g., counterclockwise when viewing the reciprocating saw 10 as shown in FIG. 2). In particular, the mass portion 122 of the counterweight 114 tends to move the saw 10 in the cutting direction during the non-cutting stroke, which helps drive the reciprocating saw 10 and the saw blade 112 into the work piece at the start of the next cutting stroke. In contrast, if the counterweight 114 rotated in the opposite direction, the reciprocating saw 10 and the saw blade 112 may tend to move away from the work piece during the start of the next cutting stroke. By rotating the counterweight 114 in the clockwise direction R, a user can more easily initiate cuts into a work piece and significantly reduce the amount of time required to cut through the work piece.

Figure 5:
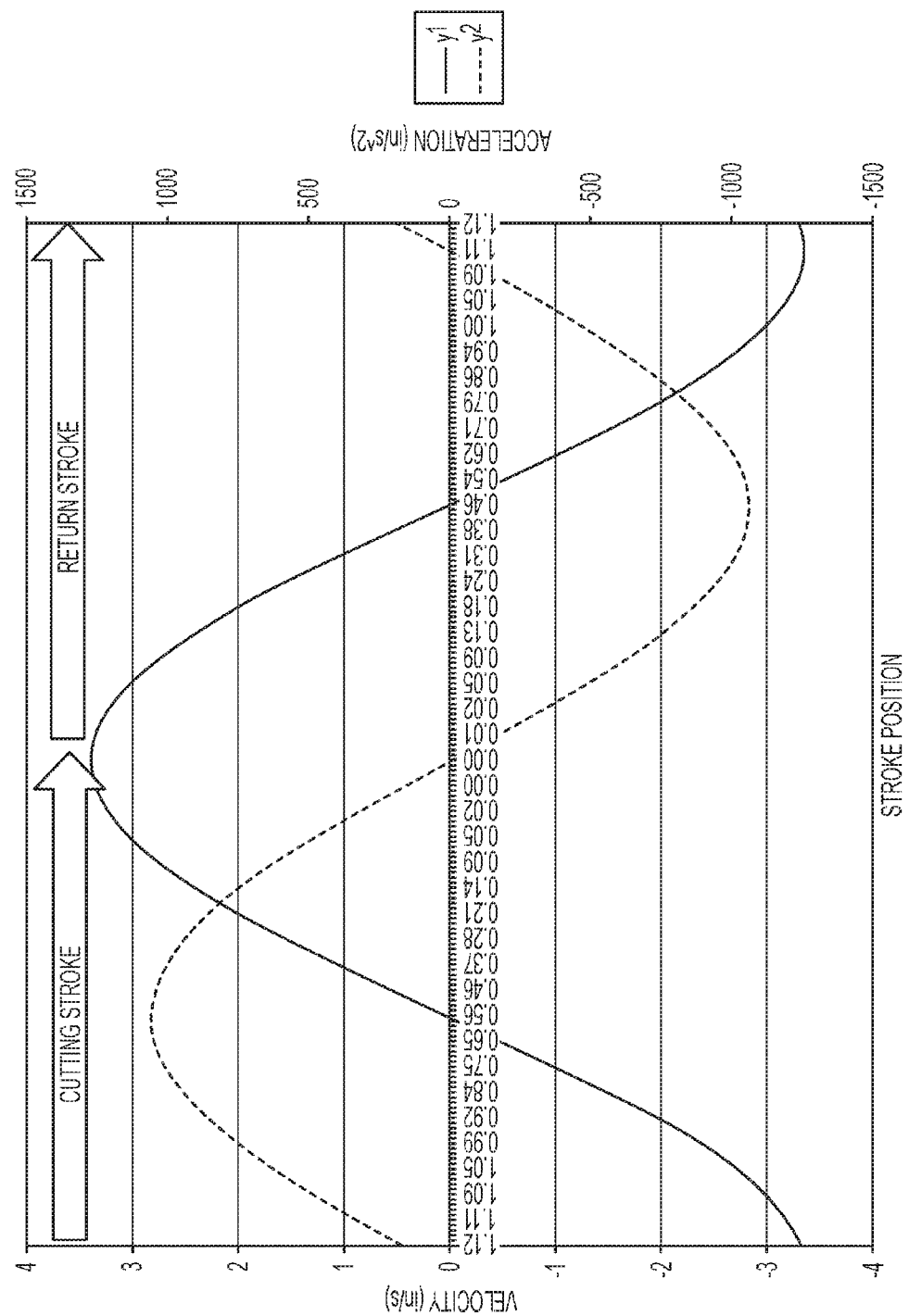
FIG. 5 is a graph depicting vertical vibration caused by a counterweight moving in accordance with the present invention.
Figure 6:
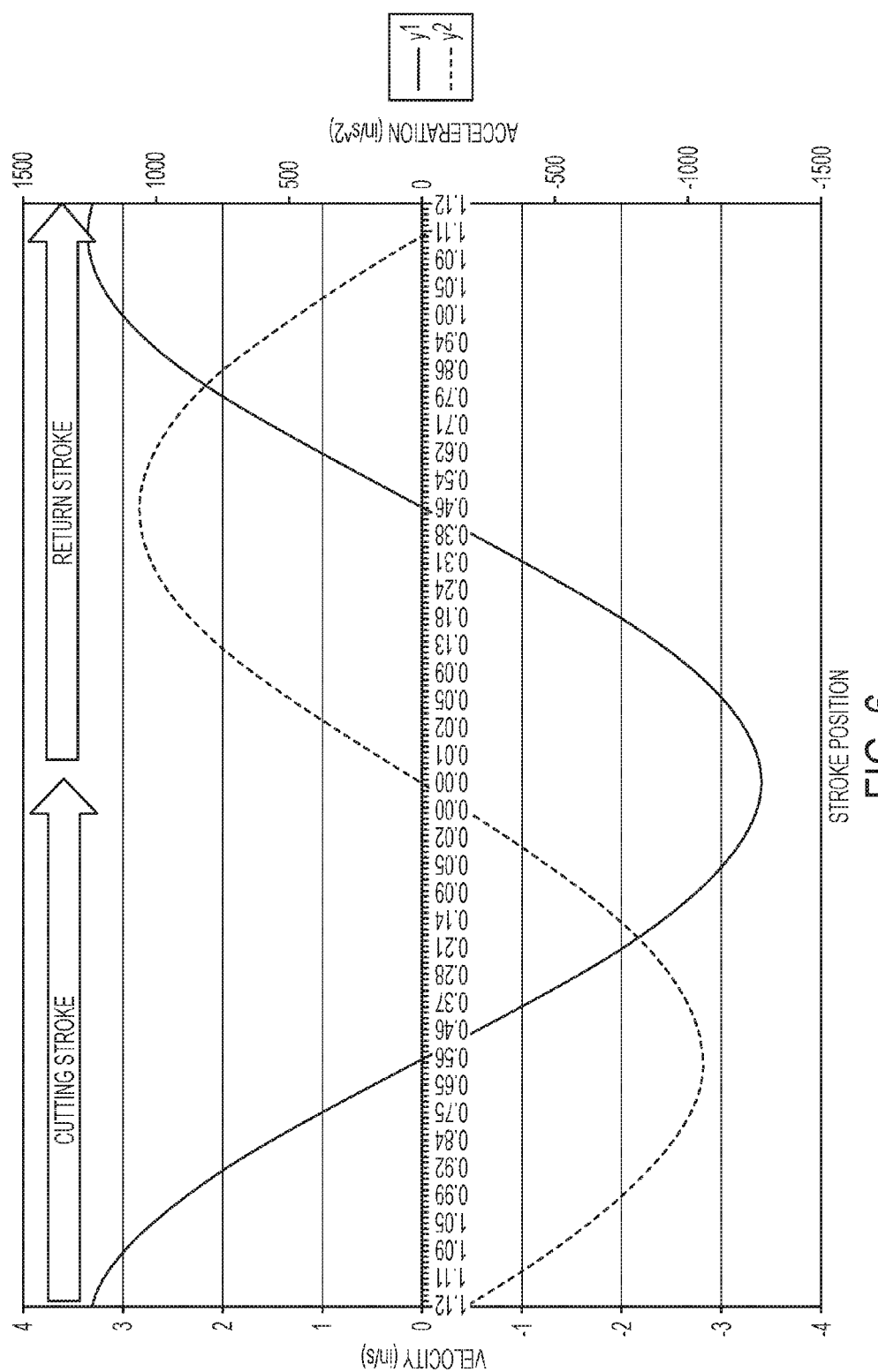
FIG. 6 is a graph depicting vertical vibration caused by a counterweight moving in an opposite direction than the present invention.

FIG. 5 is a graph depicting vibrations generated by the reciprocating saw 10 in a vertical direction during operation, while FIG. 6 is a graph depicting vibrations generated by a reciprocating saw including a counterweight that is rotated in an opposite direction than the counterweight 114 discussed above. As shown in FIG. 5, the velocity of the saw 10 lags its acceleration. Thus, the velocity of the clockwise-rotating saw 10 counterweight 114 is downward at the end of the return stroke and at the beginning of the cutting stroke. This downward velocity results in a force that drives the saw 10, and more particularly the saw blade 112, into a work piece to start cutting the work piece. In contrast, the velocity of a counterclockwise-rotating saw 10, as depicted in FIG. 6, results in a force that drives the saw 10 and the saw blade 112 upward at the end of the return stroke and at the beginning of the cutting stroke. With the arrangement depicted in FIG. 6, the saw and saw blade are pulled away from a work piece at the start of each cut, which may cause the saw to "jump" and reduce cutting efficiency.

Although the invention has been described with reference to certain preferred embodiments, variations and modifications exist within the scope and spirit of one or more independent aspects of the invention. Various features and advantages of the invention are set forth in the following claims.

What is claimed is:

1. A reciprocating saw comprising:
a housing;
a motor positioned within the housing, the motor including a pinion that rotates about a motor axis; and
a drive mechanism positioned within the housing and coupled to the motor, the drive mechanism including
a driven gear engaging the pinion and rotatable by the motor in a rotational direction about a central axis that is perpendicular to the motor axis, the driven gear having a circumference and being vertically-oriented within the housing, wherein the motor axis extends through a center of the driven gear to divide the driven gear into an upper portion and a lower portion,
a connecting rod having a first end coupled to the driven gear and a second end opposite the first end, the connecting rod translating rotary motion of the driven gear into reciprocating motion,
an output shaft coupled to the second end of the connecting rod to reciprocate relative to the housing along a spindle axis through a cutting stroke and a return stroke, the upper portion of the driven gear is located on a same side of the motor axis as the spindle axis, a blade clamp coupled to an end of the output shaft opposite from the connecting rod, the blade clamp configured to receive a saw blade, and a counterweight coupled to the driven gear and rotating with the driven gear in the rotational direction, the counterweight having a connection portion coupled to the first end of the connecting rod and a mass portion extending from the connection portion, the mass portion defining a curved outer perimeter matching the circumference of the driven gear, the curved outer perimeter extending less than half the circumference of the driven gear, the mass portion having a leading edge, a trailing edge, and an aperture positioned closer to the trailing edge than to the leading edge in the rotational direction, the counterweight moving through the upper portion of the driven gear during the cutting stroke of the output shaft, and moving through the lower portion of the driven gear during the return stroke of the output shaft;

wherein the motor axis and the spindle axis define a plane, and wherein the central axis of the driven gear is perpendicular to the plane.

2. The reciprocating saw of claim 1, wherein the counterweight is shaped and sized so that the counterweight does not extend outside of a vertical footprint area defined by the driven gear.

3. The reciprocating saw of claim 1, wherein the drive mechanism also includes a crank pin coupling the connecting rod to the driven gear and coupling the connection portion of the counterweight to the connecting rod.

4. The reciprocating saw of claim 3, wherein the first end of the connecting rod is positioned between the driven gear and the counterweight.

5. The reciprocating saw of claim 1, wherein the driven gear and the counterweight are separate elements.

6. The reciprocating saw of claim 1, wherein the drive mechanism also includes a guide pin extending from the connection portion of the counterweight and engaging an inner surface of the housing.

7. The reciprocating saw of claim 6, wherein the guide pin defines an axis of rotation of the counterweight that is coaxial with the central axis of the driven gear.

8. The reciprocating saw of claim 1, wherein the housing includes two clamshell halves coupled together along a plane, and wherein the plane defined by the clamshell halves is the same as the plane defined by the motor axis and the spindle axis.

9. The reciprocating saw of claim 1, wherein the housing includes a rearward portion having a handle, a forward portion supporting a shoe, and a longitudinal axis extending through the rearward and forward portions, and wherein the motor axis is parallel to the longitudinal axis.

10. The reciprocating saw of claim 9, wherein the counterweight rotates along a path, wherein as the counterweight moves through a rearward half of the path, the counterweight generally moves toward the spindle axis, and wherein as the counterweight moves through a forward half of the path, the counterweight generally moves away from the spindle axis.

11. The reciprocating saw of claim 9, wherein the handle supports a trigger for selectively powering the motor, and wherein the trigger is positioned on a same side of the motor axis as the upper portion of the driven gear.

12. The reciprocating saw of claim 1, wherein the spindle axis is positioned on a same side of the motor axis as the upper portion of the driven gear.

13. The reciprocating saw of claim 1, wherein the housing includes a battery support portion configured to receive a battery pack.

14. The reciprocating saw of claim 1, wherein the pinion is positioned between the driven gear and the counterweight.

15. The reciprocating saw of claim 1, further comprising a shoe pivotally coupled to a forward portion of the housing adjacent the blade clamp, wherein the shoe pivots about a pivot axis.

16. The reciprocating saw of claim 15, wherein the central axis of the driven gear is parallel to the pivot axis of the shoe.

17. The reciprocating saw of claim 13, wherein the housing includes a rearward portion having a handle, and wherein the battery support portion is formed on the rearward portion of the housing below the handle.

18. The reciprocating saw of claim 13, wherein the battery support portion is positioned on a same side of the motor axis as the lower portion of the driven gear.

19. The reciprocating saw of claim 11, wherein the trigger is positioned entirely above the motor axis.

* * * * *